United States Patent [19]
Kato et al.

[11] Patent Number: 5,746,680
[45] Date of Patent: May 5, 1998

[54] CONTROL SYSTEM FOR AUTOMATIC TRANSMISSIONS

[75] Inventors: Akira Kato; Toru Kitamura; Hisashi Igarashi; Sakae Suzuki; Yasuo Takagi; Toshiaki Hirota; Jun Takahashi, all of Wako, Japan

[73] Assignee: Honda Giken Kogyo Kabushiki Kaisha, Tokyo, Japan

[21] Appl. No.: 763,256

[22] Filed: Dec. 10, 1996

[51] Int. Cl.$^6$ .................................................. B60K 41/10
[52] U.S. Cl. ........................................ 477/95; 477/119
[58] Field of Search .......................... 477/95, 119, 129, 477/132

[56] References Cited

U.S. PATENT DOCUMENTS

| | | | |
|---|---|---|---|
| 4,350,234 | 9/1982 | Suga et al. | 477/119 |
| 5,022,286 | 6/1991 | Takizawa | 477/119 |
| 5,054,336 | 10/1991 | Takizawa | 477/119 |
| 5,105,923 | 4/1992 | Iizuka | 477/119 |
| 5,637,055 | 6/1997 | Lee | 477/119 |

FOREIGN PATENT DOCUMENTS

| | | |
|---|---|---|
| 62-9774 | 3/1987 | Japan . |
| 1-269748 | 10/1989 | Japan . |

*Primary Examiner*—Dirk Wright
*Attorney, Agent, or Firm*—Nikaido, Marmelstein, Murray & Oram LLP

[57] ABSTRACT

A control system for an automatic transmission of an internal combustion engine installed on an automotive vehicle measures a duration over which the automatic transmission continues to be in a speed position. Downshift of the speed position of the transmission to a lower speed position is inhibited if the measured duration does not exceed a predetermined time period, when it is determined that the automotive vehicle is in a predetermined decelerating condition.

10 Claims, 8 Drawing Sheets

1

CONTROL SYSTEM FOR AUTOMATIC TRANSMISSIONS

BACKGROUND OF THE INVENTION

1. Field of the Invention

This invention relates to a control system for automatic transmissions of automotive vehicles, and more particularly to a control system of this kind which controls the speed position of an automatic transmission of an automotive vehicle to effect a downshift of the vehicle during deceleration.

2. Prior Art

Conventionally, a control system for automatic transmissions of automotive vehicles has been proposed e.g. by Japanese Patent Publication (Kokoku) No. 62-9774, which controls an automatic transmission such that the vehicle is automatically downshifted into a lower speed position (lower speed gear) during deceleration of the automotive vehicle only under predetermined conditions of the vehicle in which engine brake is demanded to thereby obtain a sufficient engine brake force without displeasing the driver by unnecessarily frequent deceleration of the vehicle. Further, there has also been proposed a control system of this kind which determines a lower speed position into which the vehicle should be downshifted, according to the gear position (speed position) of the transmission currently in use and the current deceleration of the vehicle (Japanese Laid-Open Patent Publication (Kokai) No. 1-269748).

However, these conventional control systems cannot always accurately determine that the vehicle is in a predetermined decelerating condition in which a downshift is to be effected, and therefore, a discord can occur between the determination as to deceleration of the vehicle and the driver's intention of decelerating the vehicle. As a result, the vehicle tends to downshifted more often than required, resulting in degraded driveability of the vehicle.

SUMMARY OF THE INVENTION

It is the object of the invention to provide a control system for an automatic transmission of an automotive vehicle, which is capable of preventing the speed position of the transmission from being changed more often than required when the vehicle is decelerated, thereby preventing the driveability of the vehicle from being degraded while securing a sufficient engine brake force as improved fuel economy.

To attain the above object of the invention, the invention provides a control system for an automatic transmission of an internal combustion engine installed on an automotive vehicle, including deceleration-determining means for determining whether the automotive vehicle is in a predetermined decelerating condition, speed position-detecting means for detecting a speed position of the automatic transmission, and downshift control means for effecting a downshift of the speed position of the automatic transmission to a lower speed position when it is determined by the deceleration-determining means that the automotive vehicle is in the predetermined decelerating condition.

The control system according to the invention is characterized by comprising measuring means for measuring a duration over which the automatic transmission continues to be in the speed position detected by the speed position-detecting means; and inhibiting means for inhibiting the downshift control means from effecting the downshift of the speed position to the lower speed position if the duration measured by the measuring means does not exceed a predetermined time period, when it is determined by the deceleration-determining means that the automotive vehicle is in the predetermined decelerating condition.

Preferably, the control system includes vehicle speed-detecting means for detecting a traveling speed of the automotive vehicle, and the predetermined time period is set according to at least one of the traveling speed and the speed position of the automatic transmission detected by the speed position-detecting means.

More preferably, the predetermined time period is set to a shorter time period as the traveling speed of the automotive vehicle is higher and at the same time the speed position of the automatic transmission detected by the speed position-detecting means is a higher speed position.

Preferably, the control system includes speed position-determining means for determining whether or not said speed position of the automatic transmission detected by the speed position-detecting means is a predetermined speed position or a higher speed position than the predetermined speed position, and the measuring means measures a duration over which the speed position of the automatic transmission continues to be in the predetermined speed position or the higher speed position than the predetermined speed position, the inhibiting means inhibiting the downshift control means from effecting the downshift of the speed position of the automatic transmission to the lower speed position, if the duration measured by the measuring means, over which the speed position of the automatic transmission continues to be in the predetermined speed position or the higher speed position than the predetermined speed position, does not exceed the predetermined time period, when it is determined by the deceleration-determining means that the automotive vehicle is in the predetermined decelerating condition.

Preferably, the automotive vehicle includes an accelerator pedal, the control system including vehicle speed-detecting means for detecting a traveling speed of the automotive vehicle, accelerator pedal opening-detecting means for detecting a stepping amount of the accelerator pedal, and braking condition-detecting means for detecting a braking condition of the automotive vehicle, the inhibiting means being enabled if a deceleration of the automotive vehicle is larger than a predetermined value, when the traveling speed of the automotive vehicle is higher than a predetermined value, the stepping amount of the accelerator pedal detected by the accelerator pedal opening-detecting means is smaller than a predetermined value and at the same time it is detected by the braking condition-detecting means that the automotive vehicle is being braked.

Also preferably, the automotive vehicle includes an accelerator pedal, the control system including vehicle speed-detecting means for detecting a traveling speed of the automotive vehicle, accelerator pedal opening-detecting means for detecting a stepping amount of the accelerator pedal, and braking condition-detecting means for detecting a braking condition of the automotive vehicle, the inhibiting means being enabled if the traveling speed of the automotive vehicle is higher than a second predetermined value and at the same time a deceleration of the automotive vehicle continues to be smaller than a predetermined value over a second predetermined time period, when the vehicle speed is higher than a first predetermined value, the stepping amount of the accelerator pedal detected by the accelerator pedal opening-detecting means is lower than a predetermined value, and at the same time it is detected by the braking-condition detecting means that the automotive vehicle is not being braked.

Preferably, the second predetermined time period is set to a shorter time period as the traveling speed of the automotive vehicle is higher.

Preferably, the control system includes engine speed-detecting means for detecting a rotational speed of the engine, and the downshift control means sets the lower speed position to which the speed position of the automatic transmission is to be downshifted, according to the rotational speed of the engine detected by the engine speed-detecting means. More preferably, the downshift control means determines an applicable lower speed position to which the speed position of the automatic transmission is to be downshifted, according to a deceleration of the automotive vehicle.

Preferably, the control system includes vehicle speed-detecting means, and the downshift control means determines an applicable lower speed position to which the speed position of the automatic transmission is to be downshifted, according to a decelerating force calculated based on the traveling speed of the automotive vehicle detected by the vehicle speed-detecting means, and an engine brake force calculated based on the detected traveling speed and a desired speed position of the automatic transmission.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
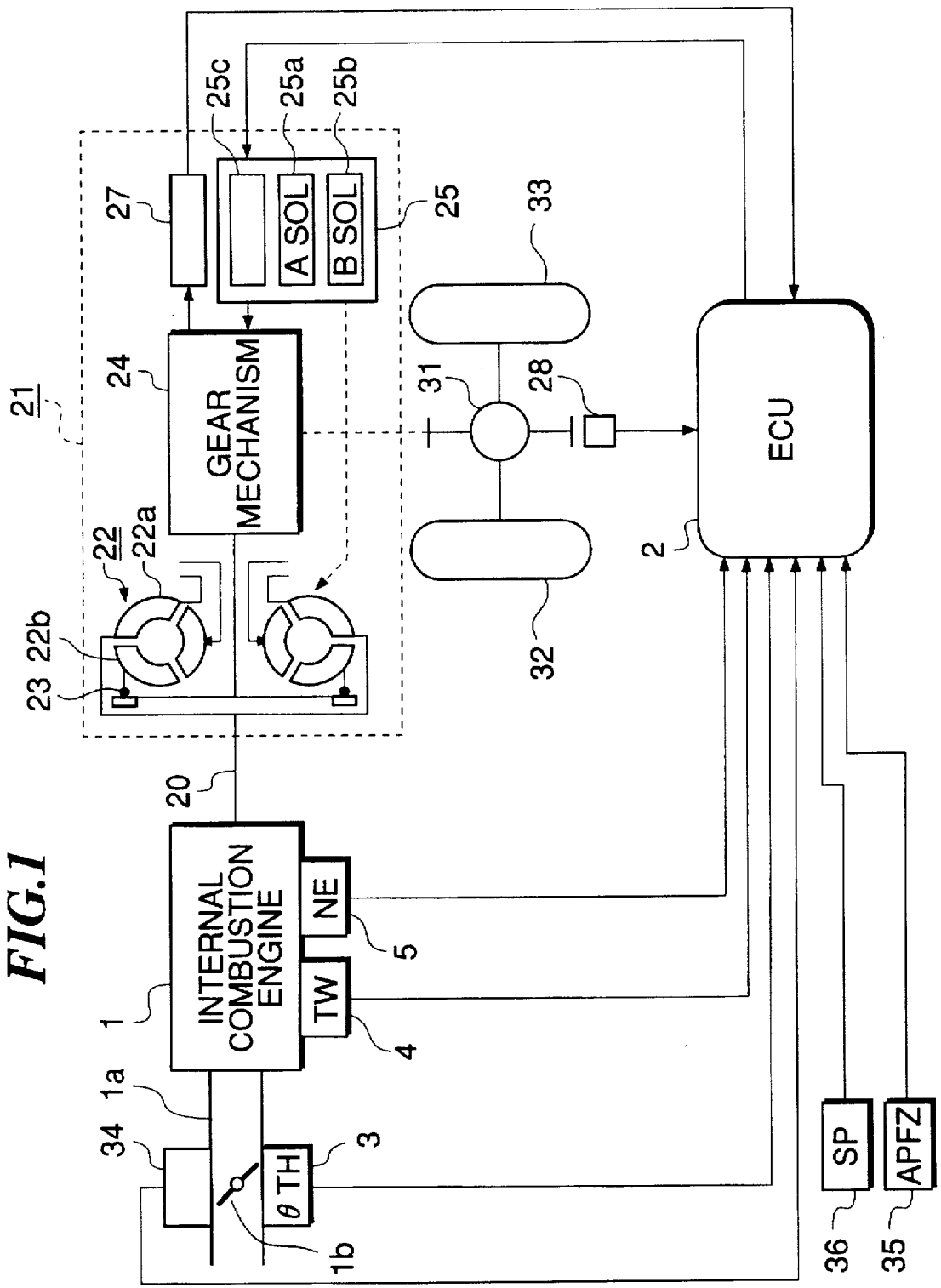
FIG. 1 is a diagram schematically showing the whole arrangement of an automotive vehicle, on which are installed an automatic transmission and a control system therefor according to an embodiment of the invention, etc.

Referring first to FIG. 1, there is shown the whole arrangement of an automotive vehicle, on which are installed an automatic transmission, and a control system therefor according to an embodiment of the invention, etc. An internal combustion engine (hereinafter simply referred to as "the engine") 1 has a crankshaft 20 to which is connected the automatic transmission 21. The automatic transmission 21 is comprised of a torque converter 22 having a pump impeller 22a and a turbine runner 22b, a lock-up clutch 23 for coupling the pump impeller 22a and the turbine runner 22b together, a gear mechanism 24 connected to an output side of the torque converter 22, and a hydraulic control device 25 for controlling the operation of the lock-up clutch 23 and that of the gear mechanism 24.

The hydraulic control device 25 includes an ON-OFF type solenoid valve (hereinafter referred to as "the A solenoid valve") 25a for switching between engagement and disengagement of the lock-up clutch 23, a duty ratio control type solenoid valve (hereinafter referred to as "the B solenoid valve") 25b for controlling the engaging force of the lock-up clutch 23 when the A solenoid valve 25a is energized or open to thereby hold the lock-up clutch 23 in engagement, and a transmission actuator 25c for controlling the gear position (i.e. change gear ratio) of the gear mechanism 24. The A solenoid valve 25a, the B solenoid valve 25b and the transmission actuator 25c are all electrically connected to an electronic control unit (hereinafter referred to as "the ECU") 2 for controlling the automatic transmission 21. The ECU 2 controls the operation of the lock-up clutch 23 by means of the A solenoid valve 25a and the B solenoid valve 25b, and at the same time controls the gear position of the gear mechanism 24 by means of the transmission actuator 25c.

Arranged in the automatic transmission 21 is a gear position sensor 27 which detects the gear position NGRAT of the gear mechanism 24, for supplying an electric signal indicative of the sensed gear position to the ECU 2.

Torque output from the engine 1 is transmitted from the crankshaft 20 through the torque converter 22, the gear mechanism 24 and a differential gear mechanism 31 to right and left drive wheels 32, 33 in the mentioned order, thereby driving these wheels. A vehicle speed sensor 28 which detects the vehicle speed VP of the automotive vehicle is arranged on an output side of the automatic transmission 21 for supplying a signal indicative of the sensed vehicle speed to the ECU 2.

The engine 1 has a throttle valve opening sensor 3 for detecting the valve opening θTH of a throttle valve 1b arranged in an intake pipe 1a of the engine. The engine 1 is also provided with an engine coolant temperature sensor 4 for detecting engine coolant temperature (TW), and an engine rotational speed sensor 5 for detecting the rotational speed (NE) of the engine. Signals from these three sensors are supplied to the ECU 2. The engine rotational speed sensor 5 generates a pulse (hereinafter referred to as "the TDC signal pulse") at a predetermined crank angle position of each cylinder of the engine a predetermined angle before a TDC position of the cylinder corresponding to the start of the intake stroke thereof (whenever the crankshaft 20 rotates through 180 degrees in the case of a four-cylinder engine), for supplying the TDC signal pulse to the ECU 2.

Further, the throttle valve 1b is coupled to a throttle actuator 34 which is comprised e.g. of an electric motor electrically connected to the ECU 2. Further connected to the ECU 2 is an accelerator pedal opening sensor 35 which detects the stepping amount (hereinafter referred to as "the accelerator pedal opening") APFZ of an accelerator pedal, not shown, of the automotive vehicle, for supplying an electric signal indicative of the sensed accelerator pedal opening to the ECU 2. The ECU 2 controls the throttle valve opening θTH in response to signals indicative of the accelerator pedal opening APFZ, etc. That is, in the present embodiment, the accelerator pedal and the throttle valve 1b are not mechanically connected to each other, but the throttle valve opening θTH is controlled based on the accelerator pedal opening APFZ detected by the accelerator pedal opening sensor 35 and other operating parameters of the engine.

Further, a shift lever position sensor 36 which detects a shift lever position for selecting an operating mode of the automatic transmission 21 is connected to the ECU 2 for supplying a signal indicative of the sensed shift lever position to the same. In the present embodiment, the automatic transmission 21 is provided with D4 and D3 ranges as drive ranges. In the D4 range, the gear position of the gear mechanism 24 is automatically selected within a range of the first speed position to the fourth speed position, and in the D3 range, the gear position is automatically selected within a range of the first speed position to the third speed position.

Further, the ECU 2 is connected to another electronic control unit, not shown, for controlling the operation of the engine 1, which controls the amount of fuel supplied to the engine 1 (i.e. valve opening periods of fuel injection valves), ignition timing, and so forth. The ECU 2 and the electronic control unit for controlling the engine operation transmit information on control parameters to each other.

The ECU 2 is comprised of an input circuit having the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU"), a memory device comprised of a ROM storing various operational programs which are executed by the CPU and various maps, referred to hereinafter, and a RAM for storing results of calculations from the CPU, etc., and an output circuit which outputs and delivers driving signals to the A solenoid valve 25a, the B solenoid valve 25b and the transmission actuator 25c. The ECU 2 operates in response to the above-mentioned signals from the sensors to control the operation of the lock-up clutch 23, the gear position, and the throttle valve opening θTH. Programs described below with reference to flowcharts are executed by the CPU of the ECU 2.

Figure 2:
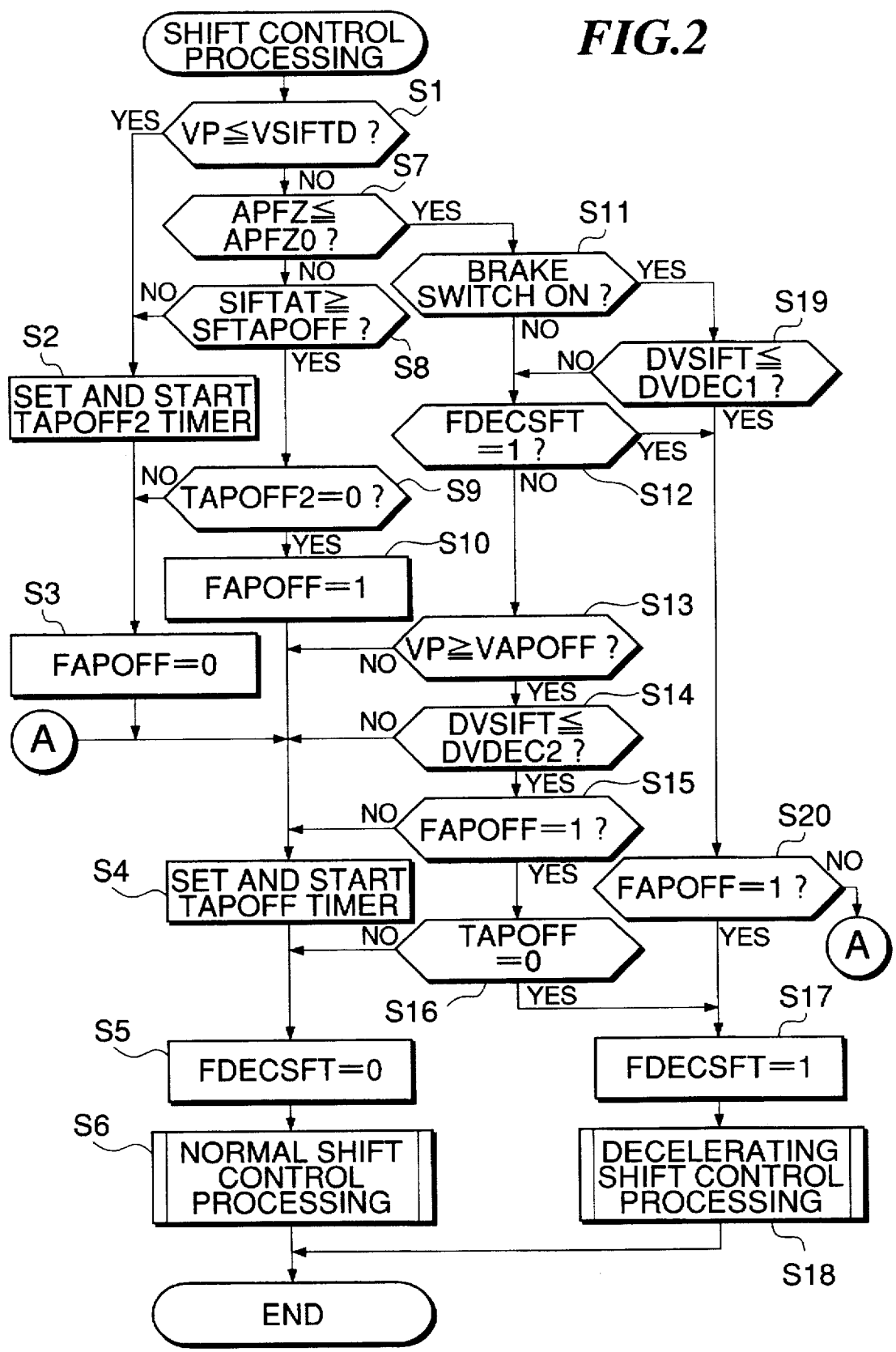
FIG. 2 is a flowchart showing a routine for carrying out control by the control system during deceleration of the automotive vehicle.

FIG. 2 shows a routine for carrying out shift control of the automatic transmission during deceleration of the automotive vehicle, which is executed by the control system for the automatic transmission according to the present embodiment. This routine is executed at predetermined time intervals of e.g. 80 msec.

Figure 3A:
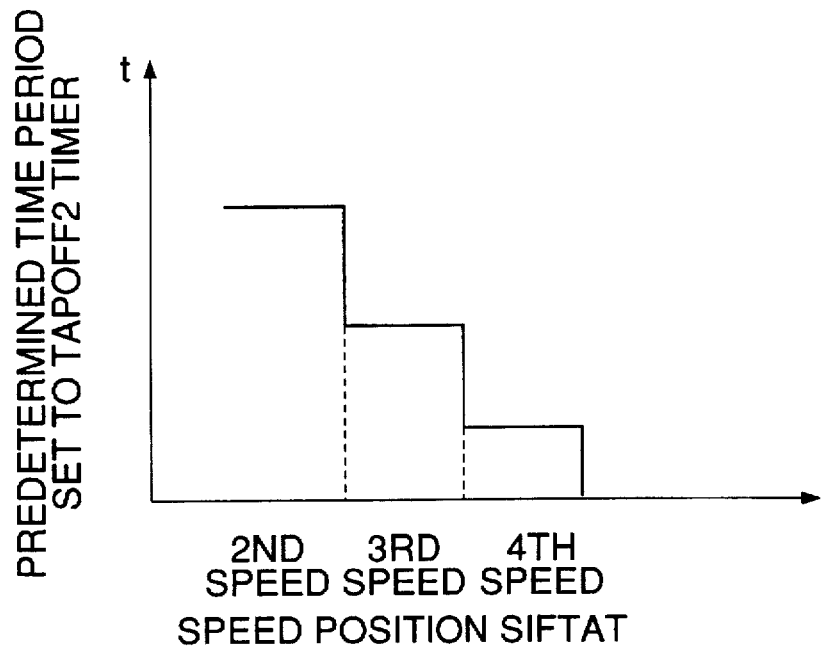
FIG. 3A shows a table for determining a predetermined time period set to a TAPOFF timer.

First, at a step S1, it is determined whether or not the vehicle speed VP is equal to or lower than a predetermined reference value VSIFTD (e.g. 50 km/h). If VP≦VSIFTD holds, the program proceeds to a step S2, wherein a TAPOFF2 timer is set to a predetermined time period and started. The predetermined time period is set depending on the gear position of the gear mechanism 24 of the automatic transmission sensed by the gear position sensor 27 (hereinafter referred to as "the speed position"). Preferably, the predetermined time period is set such that it is shorter as the present speed position SIFTAT is a higher speed position (see FIG. 3A). This is for applying engine brake more promptly in the case where it is required, by shortening a delay time period required to elapse before execution of decelerating downshift control, as the present speed position SIFTAT assumes a higher speed position, when the vehicle speed VP is equal to or lower than the predetermined reference value VSIFID.

Figure 3B:
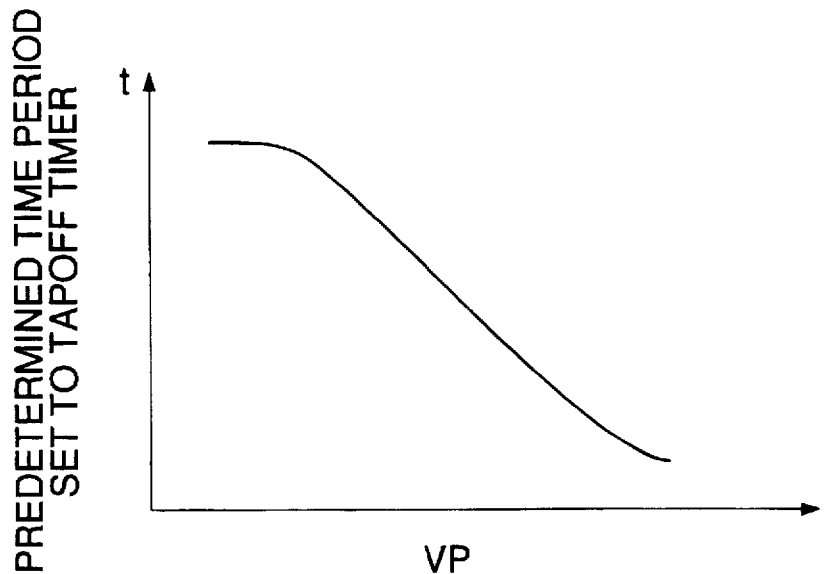
FIG. 3B shows a table for determining a predetermined time period set to a TAPOFF2 timer.

At the following step S3, a flag FAPOFF which, when set to "1", indicates that the speed position has continued to be a predetermined reference speed position (fourth speed position in the present embodiment) or a higher speed position with the accelerator pedal stepped on over a predetermined time period, is set to "0", and then at a step S4, a TAPOFF timer is set to a predetermined time period and started. This predetermined time period is set according to the vehicle speed VP. Preferably, the predetermined time period is set such that it is shorter as the vehicle speed VP is higher (see FIG. 3B). This is for applying engine brake more promptly in the case where it is required, by shortening a delay time period required to elapse before execution of the decelerating downshift control, as the vehicle speed VP is higher, when a brake switch, not shown, is off, i.e. when brake is not applied.

Then, at a step S5, a flag FDECSHT, which, when set to "1", indicates that the decelerating downshift control is being executed, is set to "0", and then normal shift control, described hereinafter, is carried out at a step S6, followed by terminating the program.

If the answer to the question of the step S1 is negative (NO), i.e. if VP>VSIFTD holds, it is determined at a step S7 whether or not the accelerator pedal opening APFZ is equal to or smaller than a predetermined reference value APFZ0 (e.g. 1.5 degrees).

If APFZ>APFZ0 holds at the step S7, i.e. if the accelerator pedal opening APFZ exceeds the predetermined reference value APFZ0, it is determined at a step S8 whether or not the present speed position SIFTAT is the predetermined reference speed position SFTAPOFF or a higher speed position. The predetermined reference speed position SFTAPOFF may be "the third speed position".

If SIFTAT<SFTAPOFF holds at the step S8, it is judged that a downshift has been carried out, and then the program proceeds to the step S2, whereas if SIFTAT≧SFTAPOFF holds at the step S8, it is determined at a step S9 whether or not the count TAPOFF2 of the TAPOFF2 timer is equal to "0".

If TAPOFF2=0 does not hold at the step S9, it is judged that the speed position has not continued to be the predetermined reference speed position or a higher speed position with the accelerator pedal stepped on over the predetermined time period, and accordingly the steps S3 to S6 are executed, followed by terminating the program. If TAPOFF2=0 holds at the step S9, it is judged that the above-mentioned speed position state has continued over the predetermined time period, and then the flag FAPOFF is set to "1" at a step S10, and the program proceeds to the step S4.

Figure 4:
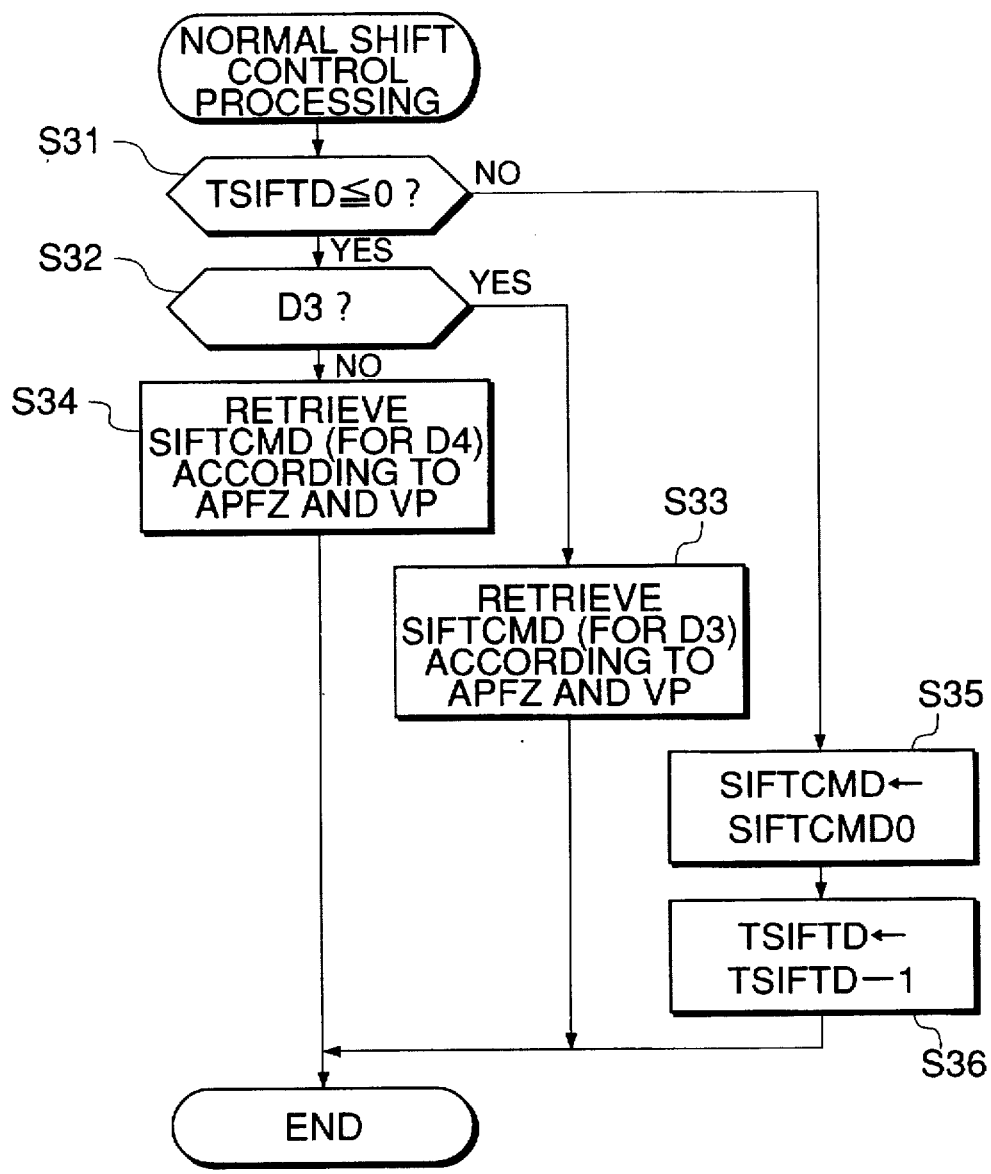
FIG. 4 is a flowchart showing a subroutine for carrying out normal shift control, which is executed at a step S6 in FIG. 2.

Next, the manner of the normal shift control executed at the step S6 in FIG. 2 will be described in detail with reference to FIG. 4.

Figure 5:
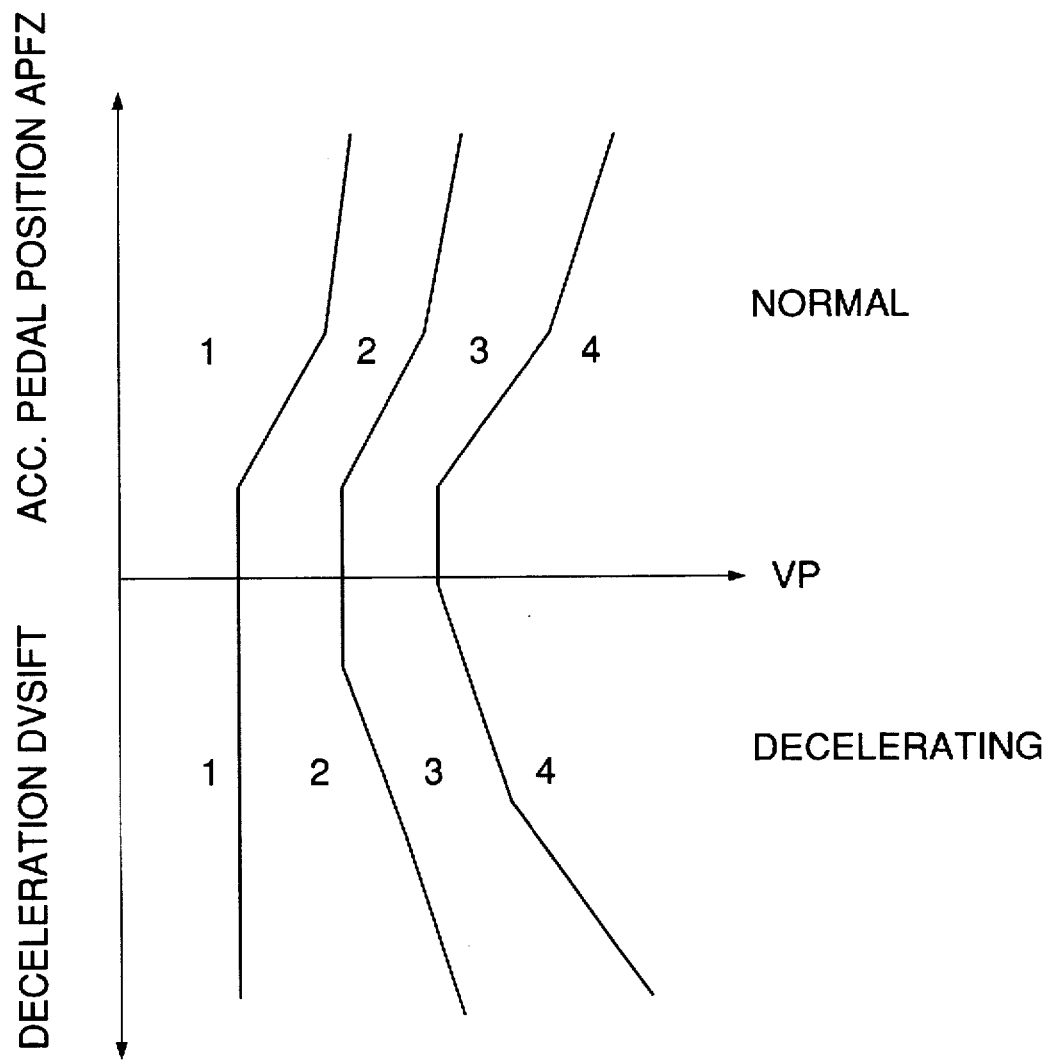
FIG. 5 shows a shift map for determining the speed position.

First, at a step S31, it is determined whether or not the count TSIFTD of a shift-hold timer TSIFTD, referred to hereinafter, for determining whether a predetermined time period has elapsed after execution of a decelerating downshift is equal to or lower than "0". If TSIFTD≦0 holds at the step S31, i.e. if the predetermined time period has elapsed after execution of the decelerating downshift, it is determined at a step S32 whether or not the shift lever position is set to the D3 range. If it is determined that the shift lever position is set to the D3 range at the step S32, the program proceeds to a step S33, wherein a desired speed position SIFTCMD is retrieved from a D3 range version of a shift map shown in FIG. 5 according to the vehicle speed VP and the accelerator pedal opening APFZ, followed by terminating the program. If it is determined that the shift lever position is not set to the D3 range at the step S32, i.e. if the shift lever position is set to the D4 range, the program proceeds to a step S34, wherein the desired speed position SIFTCMD is retrieved from a D4 range version of the FIG. 5 shift map according to the vehicle speed VP and the accelerator pedal opening APFZ, followed by terminating the program.

If TSIFTD>0 holds at the step S31, i.e. if the predetermined time period has not elapsed after execution of the decelerating downshift, the desired speed position SIFTCMD is held at the immediately preceding speed position SIFTCMD0 at a step S35, and then the count of the shift hold timer TSIFTD is decremented by "1" at a step S36, followed by terminating the program.

Referring again to FIG. 2, if APFZ≦APFZ0 holds at the step S7, it is determined at a step S11 whether or not the brake switch is on, i.e. whether brake is actually being applied.

If it is determined at the step S11 that the brake switch is off, i.e. if the driver has no intention of decelerating the vehicle, it is determined at a step S12 whether or not the flag FDECSFT assumes "1". If FDECSFT=1 does not hold, i.e. if the decelerating downshift control is not being executed, it is determined at a step S13 whether or not the vehicle speed VP is equal to or higher than a predetermined reference value VAPOFF (e.g. 50 km/h). If VP≧VAPOFF holds at the step S13, it is determined at a step S14 whether or not a value DVSIFT indicative of the degree of deceleration ΔV of the vehicle is equal to or lower than a predetermined reference value DVDEC2 (e.g. 0 km/h/t). The value DVSIFT is determined from a difference (V−V0) between the present vehicle speed value V and the immediately preceding vehicle speed value V0, and therefore DVSIFT≦DVDEC2 means that the vehicle is being decelerated, (it should be noted that as the DVSIFT falls below the predetermined reference value DVDEC2 by a larger amount, the deceleration of the vehicle is larger). If DVSIFT≦DVDEC2 holds at the step S14, it is determined at a step S15 whether or not the flag FAPOFF assumes "1". If FAPOFF=1 holds at the step S15, i.e. if the speed position continued to be the predetermined reference speed position or a higher speed position with the accelerator pedal stepped on over the predetermined time period, it is determined at a step S16 whether or not the count TAPOFF of the TAPOFF timer is equal to "0". If TAPOFF=0 holds at the step S16, i.e. if the predetermined time period has elapsed after the accelerator pedal was released, the flag FDECSFT is set to "1" at a step S17, and the decelerating shift control, which will be described in detail hereinafter, is executed at a step S18, followed by terminating the program.

If it is determined at the step S11 that the brake switch is on, i.e. if the driver has the intention of decelerating the vehicle, it is determined at a step S19 whether or not the value DVSIFT is equal to or lower than a predetermined reference value DVDEC1 (e.g. 0 km/h/t). If DVSIFT≦DVDEC1 holds at the step S19, i.e. if the driver's intention of decelerating the vehicle is positive, it is determined at a step S20 whether or not the flag FAPOFF assumes "1". If FAPOFF=1 holds at the step S20, i.e. if present speed position has continued to be the fourth speed position with the accelerator pedal stepped on over the predetermined time period, the program proceeds to the step S17, wherein the flag FDECSFT is set to "1", and the decelerating shift control processing is executed at the step S18, followed by terminating the program.

If DVSIFT>DVDFC1 holds at the step S19, i.e. if the driver's intention of decelerating the vehicle is not positive (e.g. when the vehicle is descending a slope), the program proceeds to the step S12, wherein it is determined whether or not the flag FDECSFT assumes "1" i.e. whether or not the decelerating downshift control is being executed. If FDECSFT=1 holds at the step S12, i.e. if the decelerating downshift control is being executed, the steps S20, S17 and S18 are executed, followed by terminating the program.

If FAPOFF=1 does not hold at the step S20, i.e. if the state in which the present speed position has continued to be the fourth speed position with the accelerator pedal stepped on over the predetermined time period, the program proceeds to the step S4, and then the steps S5 and S6 are executed, followed by terminating the program.

On the other hand, when it is determined at the step S11 that the brake is not actually applied, and at the same time at the step S12 that the flag FDECSFT does not assume "1", i.e. when the decelerating shift control is not being executed, if any of the answers to the questions of the steps S13 to S15 is negative (NO) (i.e. if VP<VAPOFF (e.g. 50 km/h) holds at the step S13, or if DVSIFT>DVDEC2 (e.g. 0 km/h/t) holds at the step S14, or if FAPOFF=1 does not hold at the step S15, which means that the state in which the present speed position is the fourth speed position has not continued over the predetermined time period), the steps S4 to S6 are executed, followed by terminating the program.

Further, if TAPOFF=0 does not hold at the step S16, i.e. if the predetermined time period has not elapsed after the accelerator pedal was released, the steps S5 and S6 are executed, followed by terminating the program.

Figure 6:
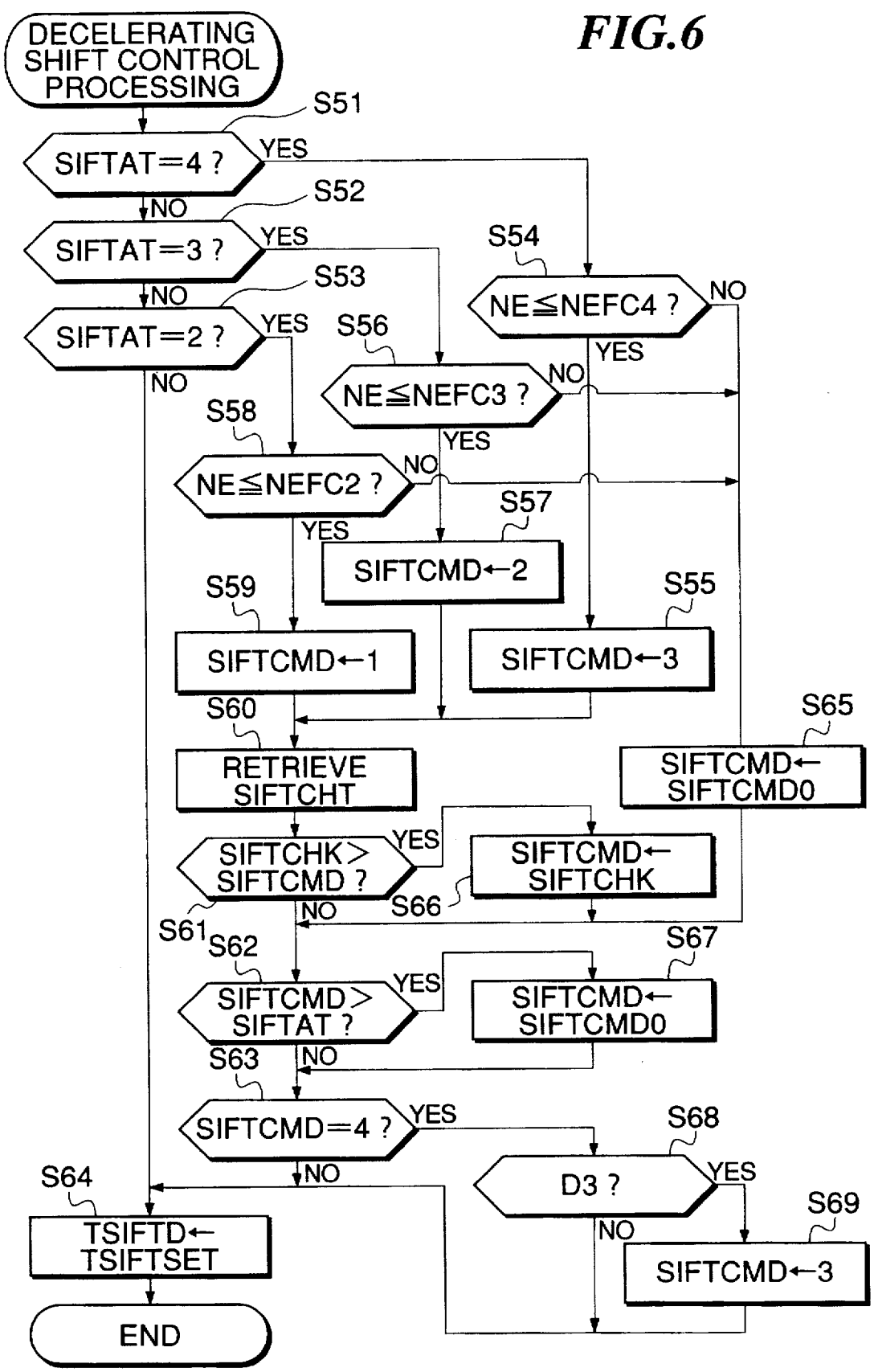
FIG. 6 is a flowchart showing a subroutine for carrying out decelerating shift control, which is executed at a step S18 in FIG. 2.

Next, the decelerating shift control executed at the step S18 in FIG. 2 will be described in detail with reference to FIG. 6.

First, it is determined at a step S51 whether or not the present speed position SIFTAT is the fourth speed position (SIFTAT=4). If SIFTAT=4 does not hold at the step S51, it is determined at a step S52 whether or not the present speed position SIFTAT is the third speed position (SIFTAT=3). If SIFTAT=3 does not hold at the step S52, it is further determined at a step S53 whether or not the present speed position is the second speed position (SIFTAT=2).

If SIFTAT=4 holds at the step S51, the program proceeds to a step S54, wherein it is determined whether or not the engine rotational speed NE is equal to or lower than a predetermined reference value NEFC4 (e.g. 1200 rpm) above which fuel cut is to be carried out during deceleration of the vehicle when the speed position is the fourth speed position. If NE≦NEFC4 holds at the step S54, the desired speed position SIFTCMD is set to the third speed position at a step S55 so as to increase the engine rotational speed NE to thereby secure a sufficient engine brake force and at the same time reduce the fuel consumption by fuel cut.

If SIFTAT=3 holds at the step S52, it is determined at a step S56 whether or not the engine rotational speed NE is equal to or lower than a predetermined reference value NEFC3 (e.g. 1300 rpm) above which fuel cut is to be carried out during deceleration of the vehicle when the speed position is the third speed position. If NE≦NEFC3 holds at the step S56, the desired speed position SIFTCMD is set to the second speed position at a step S57 to attain the same effects as mentioned above as to the step S55.

If SIFTAT=2 holds at the step S53, it is determined at a step S58 whether or not the engine rotational speed NE is equal to or lower than a predetermined reference value NEFC2 (e.g. 1350 rpm) above which fuel cut is to be carried out during deceleration of the vehicle when the speed position is the second speed position. If NE≦NEFC2 holds at the step S58, the desired speed position SIFTCMD is set to the first speed position at a step S59 to attain the same effects as mentioned above.

After setting the desired speed position SIFTCMD at the step S55, S57 or S59, a speed position SIFTCHK applicable during deceleration of the vehicle is retrieved at a step S60. The retrieval is carried out according to the shift map shown in FIG. 5 in the following manner: First, during deceleration of the vehicle ($\Delta V<0$), the speed position SIFTCHK is retrieved according to the vehicle speed VP and the deceleration degree $\Delta V$. The deceleration degree $\Delta V$ can be replaced by a physical value representative of the decelerating condition of the vehicle.

Next, it is determined at a step S61 whether or not the speed position SIFTCHK retrieved at the step S60 is a higher speed position than the desired speed position SIFTCMD. If SIFTCHK>SIFTCMD holds at the step S61, it is determined at a step S62 whether or not the desired speed position SIFTCMD is a higher speed position than the present speed position SIFTAT. If SIFTCMD>SIFTAT holds at the step S62, it is determined at a step S63 whether or not the desired speed position SIFTCMD is the fourth speed position (SIFTCMD=4). If SIFTTCMD=4 does not hold at the step S63, the shift hold timer TSIFTD is set to a predetermined time period TSIFTSET (e.g. 20 ms) during which the speed position is to be held, followed by terminating the program.

On the other hand, if NE>NEFC4 holds at the step S54, if NE>NEFC3 holds at the step S56, or if NE>NEFC2 holds at the step S58, it is judged that the engine brake force is sufficient and fuel cut has already been carried out, and then the desired speed position SIFTCMD is held at the immediately preceding speed position SIFTCMD0 at a step S65, followed by the program proceeding to the step S62.

If it is determined at the step S61 that the speed position SIFTCH applicable during deceleration of the vehicle retrieved at the step S60 is a higher speed position than the desired speed position SIFTCMD, the desired speed position SIFTCDM is set to the speed position SIFTCH at a step S66, followed by the program proceeding to the step S62.

If it is determined at the step S62 that the desired speed position SIFTCMD is a higher speed position than the present speed position SIFTAT, the desired speed position SIFTCMD is held at the immediately preceding speed position SIFTCMD0 at a step S67.

Further, if SIFTCMD=4 holds at the step S63, it is determined at a step S68 whether or not the shift lever position is set to the D3 range. If the shift lever position is not set to the D3 range, the program jumps to the step S64, whereas if the shift lever position is set to the D3 range, the desired speed position SIFTCMD is set to the third speed position at a step S69, followed by the program proceeding to the step S64.

Figure 7:
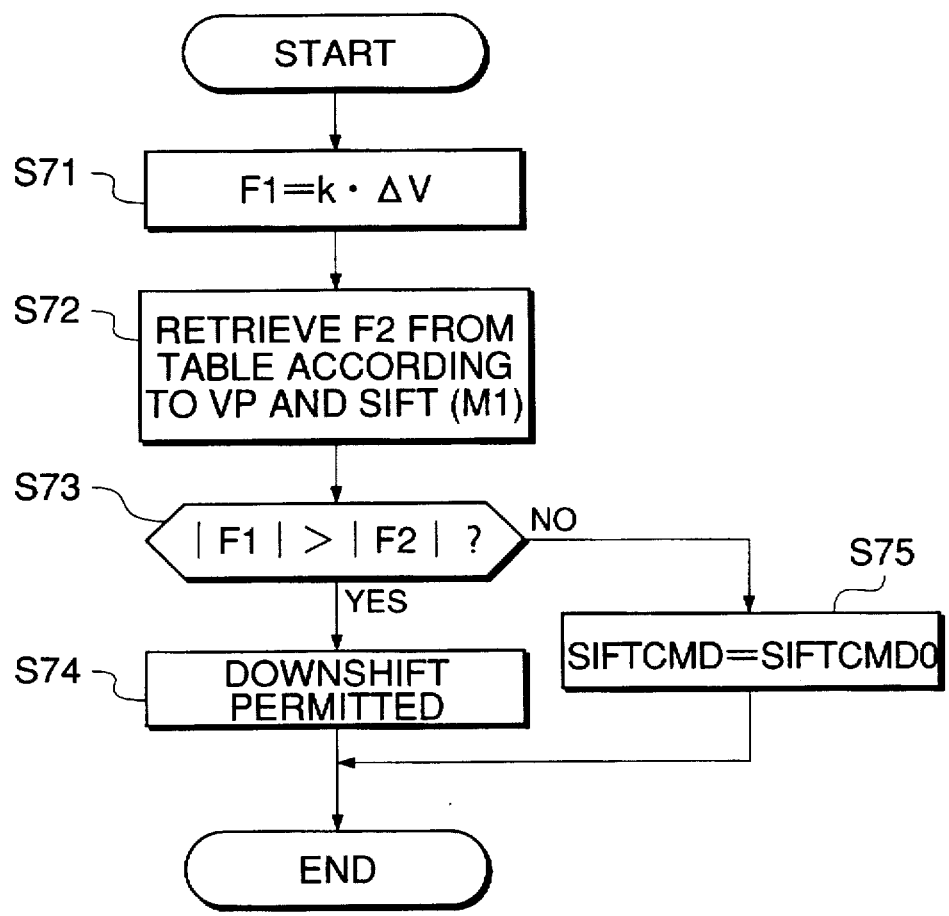
FIG. 7 is a flowchart showing a subroutine for determining whether a downshift is to be permitted during deceleration of the vehicle.

Next, another method of determining the speed position SIFTCHK applicable during deceleration of the vehicle, which is executed at the step S60 in FIG. 6, will be described with reference to FIGS. 7 and 8. FIG. 7 shows a routine for the SIFCHK determination according to another method, and FIG. 8 shows a map of the engine brake force versus the vehicle speed VP.

Figure 8:
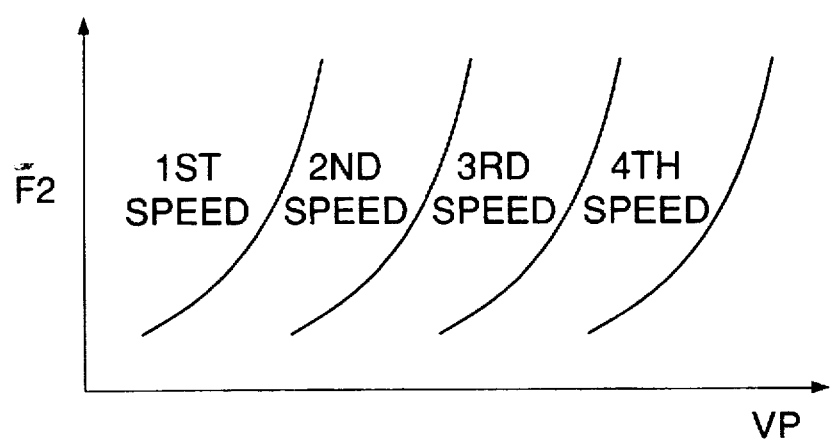
FIG. 8 shows a map for determining the engine brake force.

First, at a step S71, a decelerating force F1 is calculated based on the deceleration degree $\Delta V$ of the engine speed by the use of an equation of F1=k×$\Delta V$ (where k is a constant), and then at a step S72, a value of the engine brake force F2 is retrieved from the map in FIG. 8 according to the vehicle speed VP and the desired speed position SIFTCMD. Next, it is determined at a step S73 whether or not the absolute value of the decelerating force |F1| is larger than the absolute value of the engine brake force |F2|. If |F1|>|F2| holds at the step S73, execution of a downshift is permitted at a step S74, whereas if |F1|≦|F2| holds at the step S73, execution of the downshift is not permitted at a step S75 to avoid a shock caused by a decelerating downshift, and therefore the desired speed position SIFTCMD is held at the immediately preceding speed position SIFTCMD0. This method of determining the speed position SIFTCHK applicable during deceleration of the vehicle can set the speed position SIFTCHK more accurately than the method described hereinbefore.

To sum up, the decelerating shift control is executed at the step S18 in FIG. 2 in the following two cases:

(1) When the following conditions are fulfilled:

The accelerator pedal opening is smaller than the predetermined reference value (e.g. 1.5 degrees) (the answer to the question of the step S7 is affirmative (YES)); the brake is being applied (the answer to the question of the step S11 is affirmative(YES)); the vehicle is being decelerated (the answer to the question of the step S19 is affirmative(YES)); and the state in which the present speed position is the fourth speed position with the accelerator pedal stepped on has continued over the predetermined time period (the answer to the question of the step S20 is affirmative(YES)). In other words, in this case, the decelerating shift control at the step S18 in FIG. 2 is inhibited unless the accelerator pedal is released, and the brake is applied after the present speed position has continued to be the fourth speed position over the predetermined time period with the accelerator pedal stepped on.

(2) When the following conditions are fulfilled:

The accelerator pedal opening is smaller than the predetermined reference value (e.g. 1.5 degrees) (the answer to the question of the step S7 is affirmative (YES)); the brake is not being applied (the answer to the question of the step S11 is negative (NO)); the vehicle speed VP is higher than the predetermined reference value (e.g. 50 km/h) (the answer to the question of the step S13 is affirmative (YES)); the vehicle is being decelerated (the answer to the question of the step S14 is affirmative (YES)); the state in which the present speed position is the fourth speed position with the accelerator pedal stepped on continued over the predetermined time period (the answer to the question of the step S15 is affirmative(YES)); and the state in which the accelerator pedal is released has continued over the predetermined time period (the answer to the question of the step S16 is affirmative (YES)). In other words, in this case, the decelerating shift control processing at the step S18 is inhibited unless the state in which the speed position is the fourth speed position with the accelerator pedal stepped on continued over the predetermined time period, and at the same time the state in which the accelerator pedal is released without the brake being applied has continued over the predetermined time period.

According to the control method of the invention described above, a downshift is inhibited unless the present speed position, which is a predetermined reference speed position or a higher speed position, has continued over a predetermined time period before the vehicle is determined to be in a predetermined decelerating condition. Further, when the brake is released, a downshift is permitted only after another predetermined time period elapses. Therefore, it is possible to prevent the speed position from being frequently changed when the vehicle is being decelerated to thereby prevent the driveability of the vehicle from being degraded while securing favorable effects of improved fuel economy and creation of a sufficient engine brake force.

What is claimed is:

1. In a control system for an automatic transmission of an internal combustion engine installed on an automotive vehicle, including deceleration-determining means for determining whether said automotive vehicle is in a predetermined decelerating condition, speed position-detecting means for detecting a speed position of said automatic transmission, and downshift control means for effecting a downshift of said speed position of said automatic transmission to a lower speed position when it is determined by said deceleration-determining means that said automotive vehicle is in said predetermined decelerating condition, the improvement comprising:

measuring means for measuring a duration over which said automatic transmission continues to be in said speed position detected by said speed position-detecting means; and inhibiting means for inhibiting said downshift control means from effecting said downshift of said speed position to said lower speed position if said duration measured by said measuring means does not exceed a predetermined time period, when it is determined by said deceleration-determining means that said automotive vehicle is in said predetermined decelerating condition.

2. A control system according to claim 1, including vehicle speed-detecting means for detecting a traveling speed of said automotive vehicle, and wherein said predetermined time period is set according to at least one of said traveling speed and said speed position of said automatic transmission detected by said speed position-detecting means.

3. A control system according to claim 2, wherein said predetermined time period is set to a shorter time period as said traveling speed of said automotive vehicle is higher and at the same time said speed position of said automatic transmission detected by said speed position-detecting means is a higher speed position.

4. A control system according to claim 1, including speed position-determining means for determining whether or not said speed position of said automatic transmission detected by said speed position-detecting means is a predetermined speed position or a higher speed position than said predetermined speed position, and wherein said measuring means measures a duration over which said speed position of said automatic transmission continues to be in said predetermined speed position or said higher speed position than said predetermined speed position, said inhibiting means inhibiting said downshift control means from effecting said downshift of said speed position of said automatic transmission to said lower speed position, if said duration measured by said measuring means, over which said speed position of said automatic transmission continues to be in said predetermined speed position or said higher speed position than said predetermined speed position, does not exceed said predetermined time period, when it is determined by said deceleration-determining means that said automotive vehicle is in said predetermined decelerating condition.

5. A control system according to claim 1, wherein said automotive vehicle includes an accelerator pedal, said control system including vehicle speed-detecting means for detecting a traveling speed of said automotive vehicle, accelerator pedal opening-detecting means for detecting a stepping amount of said accelerator pedal, and braking condition-detecting means for detecting a braking condition of said automotive vehicle, said inhibiting means being enabled if a deceleration of said automotive vehicle is larger than a predetermined value, when said traveling speed of said automotive vehicle is higher than a predetermined value, said stepping amount of said accelerator pedal detected by said accelerator pedal opening-detecting means is smaller than a predetermined value and at the same time it is detected by said braking condition-detecting means that said automotive vehicle is being braked.

6. A control system according to claim 1, wherein said automotive vehicle includes an accelerator pedal, said control system including vehicle speed-detecting means for detecting a traveling speed of said automotive vehicle, accelerator pedal opening-detecting means for detecting a stepping amount of said accelerator pedal, and braking condition-detecting means for detecting a braking condition of said automotive vehicle, said inhibiting means being enabled if said traveling speed of said automotive vehicle is higher than a second predetermined value and at the same time a deceleration of said automotive vehicle continues to be smaller than a predetermined value over a second predetermined time period, when said vehicle speed is higher than a first predetermined value, said stepping amount of said accelerator pedal detected by said accelerator pedal opening-detecting means is lower than a predetermined value, and at the same time it is detected by said braking-condition detecting means that said automotive vehicle is not being braked.

7. A control system according to claim 1, wherein said second predetermined time period is set to a shorter time period as said traveling speed of said automotive vehicle is higher.

8. A control system according to claim 1, including engine speed-detecting means for detecting a rotational speed of said engine, and wherein said downshift control means sets said lower speed position to which said speed position of said automatic transmission is to be downshifted, according to said rotational speed of said engine detected by said engine speed-detecting means.

9. A control system according to claim 8, wherein said downshift control means determines an applicable lower speed position to which said speed position of said automatic transmission is to be downshifted, according to a deceleration of said automotive vehicle.

10. A control system according to claim 1, including vehicle speed-detecting means, and wherein said downshift control means determines an applicable lower speed position to which said speed position of said automatic transmission is to be downshifted, according to a decelerating force calculated based on said traveling speed of said automotive vehicle detected by said vehicle speed-detecting means, and an engine brake force calculated based on said detected traveling speed and a desired speed position of said automatic transmission.

\* \* \* \* \*